United States Patent
Lee et al.

(10) Patent No.: US 7,713,639 B2
(45) Date of Patent: May 11, 2010

(54) PROTECTIVE LAYER, COMPOSITE FOR FORMING THE PROTECTIVE LAYER, METHOD OF FORMING THE PROTECTIVE LAYER, AND PLASMA DISPLAY PANEL INCLUDING THE PROTECTIVE LAYER

(75) Inventors: Min-Suk Lee, Suwon-si (KR); Jong-Seo Choi, Suwon-si (KR); Suk-Ki Kim, Suwon-si (KR); Yuri Matulevich, Suwon-si (KR); Jae-Hyuk Kim, Suwon-si (KR); Soon-Sung Suh, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 1062 days.

(21) Appl. No.: 11/284,621

(22) Filed: Nov. 22, 2005

(65) Prior Publication Data

US 2006/0134437 A1    Jun. 22, 2006

(30) Foreign Application Priority Data

Dec. 17, 2004  (KR) ............... 10-2004-0108075
Jan. 11, 2005  (KR) ............... 10-2005-0002436

(51) Int. Cl.
    *B32B 9/00*  (2006.01)
(52) U.S. Cl. ........................... 428/701; 428/702
(58) Field of Classification Search ................ None
    See application file for complete search history.

(56) References Cited

U.S. PATENT DOCUMENTS

2001/0050528 A1*  12/2001  Sawada et al. ............. 313/486
2002/0121861 A1*  9/2002   Katou et al. ............... 313/587
2004/0145316 A1*  7/2004   Nishitani et al. .......... 313/587
2004/0239252 A1*  12/2004  Akiyama et al. ........... 313/587

FOREIGN PATENT DOCUMENTS

| EP | 1 420 434 A2 | 5/2004 |
| JP | 50 153568 | 12/1975 |
| JP | 000328412 | 6/1998 |
| JP | 10-237636 | 9/1998 |
| JP | 10231168 | 9/1998 |
| JP | 10231168 A * | 9/1998 |
| JP | 11 092212 | 4/1999 |
| JP | 047193 | 2/2004 |
| JP | 2004-342606 | 12/2004 |
| JP | 2006-207013 | 10/2006 |
| KR | 1020000048076 A * | 7/2000 |

* cited by examiner

*Primary Examiner*—Gwendolyn Blackwell
(74) *Attorney, Agent, or Firm*—Knobbe Martens Olson & Bear LLP (57) ABSTRACT

Provided are a protective layer made of magnesium oxide containing at least one rare earth element selected from the group consisting of the rare earth elements, in which the content of the at least one rare earth element is from about $5.0 \times 10^{-5}$ to about $6.0 \times 10^{-4}$ per 1 part by weight of the magnesium oxide, a composite for forming the protective layer, a method of forming the protective layer, and a plasma display panel including the protective layer. The protective layer can reduce a discharge delay time and the temperature dependency of the discharge delay time, and thus, is suitable for single scan and an increase in Xe content.

33 Claims, 6 Drawing Sheets

PROTECTIVE LAYER, COMPOSITE FOR FORMING THE PROTECTIVE LAYER, METHOD OF FORMING THE PROTECTIVE LAYER, AND PLASMA DISPLAY PANEL INCLUDING THE PROTECTIVE LAYER

CROSS-REFERENCE TO RELATED APPLICATION

This application claims the priority of Korean Patent Application No. 10-2004-0108075, filed on Dec. 17, 2004, and No. 10-2005-0002436, filed on Jan. 11, 2005, in the Korean Intellectual Property Office, the disclosures of which are incorporated herein in their entireties by reference.

BACKGROUND OF THE INVENTION

1. Field of the Invention

The present embodiments relate to a protective layer, a composite for forming the protective layer, a method of forming the protective layer, and a plasma display panel including the protective layer. More particularly, the present embodiments relate to a protective layer made of magnesium oxide containing a predetermined amount of a rare earth element which has a short discharge delay time with little temperature dependency, a composite for forming the protective layer, a method of forming the protective layer, and a plasma display panel including the protective layer.

2. Description of the Related Art

Plasma display panels (PDPs) are self-emission devices that can be easily manufactured as large displays, and have good display quality and rapid response speed. In particular, because of their thinness, PDPs have received much interest as wall-hanging displays, like liquid crystal displays (LCDs).

Figure 1:
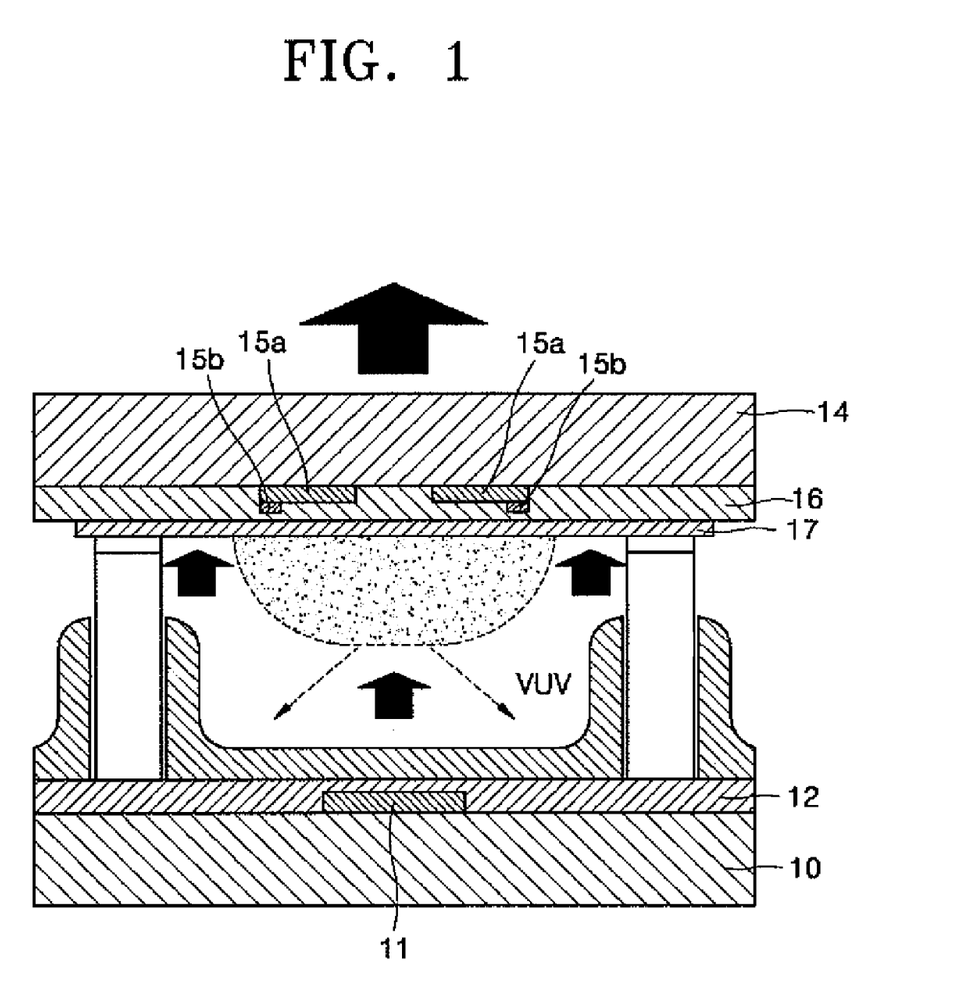
FIG. 1 is a schematic vertical sectional view illustrating an example of one pixel of a PDP in which an upper plate and a lower plate are rotated at an angle of 90 degrees.

FIG. 1 illustrates a PDP pixel. Referring to FIG. 1, sustain electrodes, each including a transparent electrode 15a and a bus electrode 15b made of a metal, are formed on a lower surface of a front substrate 14. The sustain electrodes are covered with a dielectric layer 16. The dielectric layer 16 is covered with a protective layer 17 to prevent a reduction in discharge and lifetime characteristics due to direct exposure of the dielectric layer 16 to a discharge space.

Meanwhile, an address electrode 11 is formed on an upper surface of a rear substrate 10 and is covered with a dielectric layer 12. The front substrate 14 and the rear substrate 10 are separated from each other by a predetermined gap. A space defined between the front substrate 14 and the rear substrate 10 is filled with an ultraviolet (UV)-emitting Ne+Xe mixed gas or He+Ne+Xe mixed gas under a predetermined pressure, for example 450 Torr. The Xe gas serves to emit vacuum UV (VUV) (Xe ions emit resonance radiation at 147 nm and $Xe_2$ emits resonance radiation at 173 nm).

Generally, a protective layer of a PDP performs the following three functions.

First, a protective layer protects an electrode and a dielectric layer. Discharging can occur even when only an electrode or only an electrode and a dielectric layer are used. However, when only an electrode is used, it may be difficult to control a discharge current. On the other hand, when only an electrode and a dielectric layer are used, damage to the dielectric layer by sputtering may occur. Thus, the dielectric layer must be coated with a protective layer resistant to plasma ions.

Second, a protective layer lowers a discharge initiation voltage. A discharge initiation voltage is directly correlated with the coefficient of secondary electron emission from a material constituting the protective layer by plasma ions. As the amount of secondary electrons emitted from the protective layer increases, the discharge initiation voltage decreases. In this regard, it is preferable to form a protective layer using a material with a high secondary electron emission coefficient.

Finally, a protective layer reduces a discharge delay time. The discharge delay time refers to the physical amount describing the phenomenon in which discharging occurs at a predetermined time after a voltage is applied and can be represented by the sum of two components: formation delay time (Tf) and statistical delay time (Ts). The formation delay time is the time between when a voltage is applied and when a discharge current is induced, and the statistical delay time is a statistical dispersion of the formation delay time. The lower the discharge delay time, the faster addressing can be done for single scan. Further, a lower discharge delay time can reduce scan drive costs, increase the number of sub-fields, and improve brightness and image quality.

Various requirements that must be satisfied for a protective layer for PDP have been studied. For example, Japanese Patent Laid-Open Publication No. Hei. 10-167807 discloses MgO composite ceramics in which 1-20 wt % of Sc, Y, or La microparticles are dispersed in an MgO matrix, and a preparation method thereof. The MgO composite ceramics have been developed considering that MgO has good heat resistance, corrosion resistance, and insulating property but cannot be used as a structural material since it has poor strength, fracture toughness, and thermal shock resistance. That is, the patent publication provides MgO composite ceramics in which the microparticles are combined with a MgO matrix, which are improved in mechanical characteristics such as fracture toughness and thermal shock resistance, and a preparation method thereof. Table 1 of the patent publication presents evaluation results for relative densities and elastic strengths of MgO sintered bodies described therein.

Meanwhile, Japanese Patent Laid-Open Publication No. Hei. 10-231168 discloses a Sc—MgO composite ceramic sintered body in which Sc particles are dispersed in an amount of 1-20% by volume based on the sintered body. According to the patent publication, the ceramic sintered body has high strength and high fracture toughness and undergoes a decrease in strength reduction at high temperature.

Studies on the above-mentioned sintered bodies for protective layers have been focused on improvements in mechanical characteristics of the sintered bodies or protective layers formed using the same. However, since protective layers for PDPs may significantly affect the discharge characteristics of the PDPs, in particular, a discharge delay time and the temperature dependency of the discharge delay time, developments of new protective layers considering the discharge characteristics are needed.

SUMMARY OF THE INVENTION

According to an aspect of the present embodiments, there is provided a protective layer made of magnesium oxide containing at least one rare earth element selected from the group consisting of the rare earth elements, in which the content of at least one rare earth element is from about $5.0 \times 10^{-5}$ to about $6.0 \times 10^{-4}$ parts by weight per 1 part by weight of the magnesium oxide. As discussed herein, the term "rare earth elements" means one selected from the group of the rare earth elements.

According to another aspect of the present embodiments, there is provided a protective layer made of magnesium oxide containing chromium and at least one rare earth element selected from the group consisting of the rare earth elements.

According to still another aspect of the present embodiments, there is provided a composite for forming a protective layer, the composite including: a magnesium oxide component derived from at least one magnesium-containing compound selected from the group consisting of magnesium oxide and magnesium salts; and a rare earth element component derived from at least one rare earth element-containing compound selected from the group consisting of the rare earth element oxides and the rare earth element salts.

According to still another aspect of the present embodiments, there is provided a composite for forming a protective layer, the composite including: a magnesium oxide component derived from at least one magnesium-containing compound selected from the group consisting of magnesium oxide and magnesium salts; a rare earth element component derived from at least one rare earth element-containing compound selected from the group consisting of the rare earth element oxides and the rare earth element salts; and a chromium component derived from at least one chromium-containing compound selected from the group consisting of chromium oxide and chromium salts. In one aspect, the composite further comprises one or more elements selected from the group consisting of Mn, Na, K, Cr, Fe, Zn, B, Ni, and Zr.

According to still another aspect of the present embodiments, there is provided a method of forming a protective layer, the method including: substantially uniformly mixing at least one magnesium-containing compound selected from the group consisting of magnesium oxide and magnesium salts and at least one rare earth element-containing compound selected from the group consisting of the rare earth element oxides and the rare earth element salts; calcinating the resultant mixture; sintering the calcined resultant to prepare a composite for forming a protective layer; and forming the protective layer using the composite for forming the protective layer.

According to yet another aspect of the present embodiments, there is provided a method of forming a protective layer, the method including: substantially uniformly mixing at least one magnesium-containing compound selected from the group consisting of magnesium oxide and magnesium salts, at least one rare earth element-containing compound selected from the group consisting of the rare earth element oxides and the rare earth element salts, and at least one chromium-containing compound selected from the group consisting of chromium oxide and chromium salts; calcinating the resultant mixture; sintering the calcined resultant to prepare a composite for forming a protective layer; and forming the protective layer using the composite for forming the protective layer.

According to a further aspect of the present embodiments, there is provided a PDP including the above-described protective layer.

A protective layer according to the present embodiments is made of magnesium oxide containing a predetermined amount of a rare earth element. Therefore, a discharge delay time and the temperature dependency of the discharge delay time can be reduced. Furthermore, a protective layer according to the present embodiments may also be made of magnesium oxide containing a rare earth element and chromium. In this way also, a discharge delay time and the temperature dependency of the discharge delay time can be reduced, and at the same time sputtering resistance can be enhanced. Thus, a protective layer according to the present embodiments has good discharge characteristics and is suitable for single scan and an increase in Xe content. Use of a protective layer according to the present embodiments can produce a PDP with enhanced reliability.

BRIEF DESCRIPTION OF THE DRAWINGS

The above and other features and advantages of the present embodiments will become more apparent by describing in detail exemplary embodiments thereof with reference to the attached drawings in which.

DETAILED DESCRIPTION OF THE INVENTION

The present embodiments will now be described more fully with reference to the accompanying drawings, in which exemplary embodiments are shown.

The present embodiments provide a protective layer made of magnesium oxide (MgO) containing at least one rare earth element selected from the group consisting of the rare earth elements, wherein the content of at least one rare earth element is from about $5.0 \times 10^{-5}$ to about $6.0 \times 10^{-4}$ parts by weight, based on 1 part by weight of the MgO.

The MgO contained in the protective layer is polycrystalline MgO. Generally, a protective layer may be made of monocrystalline or polycrystalline MgO.

Monocrystalline MgO that can be used in the formation of a protective layer is grown to from about 2 inch to about 3 inch particles in an arc furnace using a high-purity MgO sintered body as a source and then processed into pellets with a size of from about 3 mm to about 5 mm to be used in the formation of a protective layer. Monocrystalline MgO generally contains a predetermined amount of impurities. Table 1 presents ICP (inductively coupled plasma) analysis results for the types and amounts of impurities that may be commonly contained in monocrystalline MgO.

TABLE 1

| | Impurity | | | | | | | | | | | |
| --- | --- | --- | --- | --- | --- | --- | --- | --- | --- | --- | --- | --- |
| | Al | Ca | Fe | Si | K | Na | Zr | Mn | Cr | Zn | B | Ni |
| Content (ppm) | 80 | 220 | 70 | 100 | 50 | 50 | <10 | 10 | 10 | 10 | 20 | <10 |

Examples of impurities that may be commonly contained in monocrystalline MgO include Al, Ca, Fe, Si, K, Na, Zr, Mn, Cr, Zn, B, and Ni. The impurities that may be commonly contained in monocrystalline MgO are Al, Ca, Fe, and Si. However, a protective layer made of monocrystalline MgO requires a complicated fabrication process and where it is difficult to control the content of impurities. Furthermore, most layers made of monocrystalline MgO do not satisfy discharge characteristics necessary for PDPs.

Figure 2:
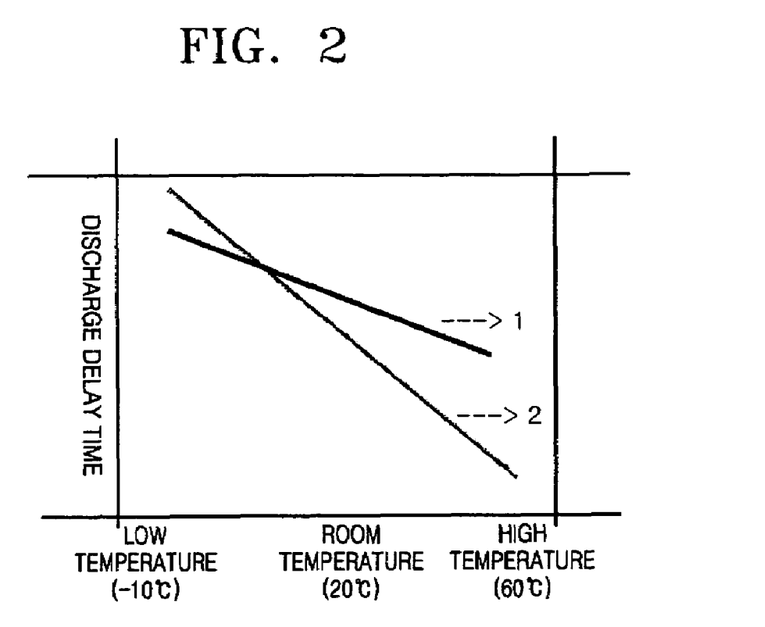
FIG. 2 is a graph illustrating a discharge delay time with temperature of a film made of monocrystalline magnesium oxide and a film made of polycrystalline magnesium oxide.

FIG. 2 illustrates a discharge delay time (graph 1) of a film made of monocrystalline MgO and a discharge delay time (graph 2) of a film made of polycrystalline MgO. Referring to graph 1, the discharge delay time of the film made of monocrystalline MgO is not substantially temperature dependent but the discharge delay time necessary for single scan is unsatisfactory.

On the other hand, referring to graph 2 illustrating the discharge delay time of the film made of polycrystalline MgO, the discharge initiation time is remarkably reduced but the temperature dependency of the discharge delay time is relatively high, as compared to the graph 1 illustrating the discharge delay time of the film made of monocrystalline MgO. However, polycrystalline MgO has a higher deposition rate than monocrystalline MgO, and thus, can exhibit a process index reduction effect. Furthermore, as discharge delay time decreases, high-speed addressing for single scan becomes possible. Therefore, a reduction in scan drive costs can be obtained and the number of sub-fields can be increased, thereby increasing brightness and image quality. That is, a reduction in discharge delay time enables realization of single scan of a high density (HD)-grade panel, and can increase brightness by increasing the number of sustains and reduce a dynamic false contour by increasing the number of sub-fields constituting a TV-field.

Thus, a protective layer according to the present embodiments may include polycrystalline MgO formed by using polycrystalline MgO as a source.

A protective layer according to the present embodiments includes at least one rare earth element selected from the group consisting of the rare earth elements. Examples of the rare earth elements include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). One or more selected from the rare earth elements may be combined with MgO. Physical properties of examples of the rare earth elements are summarized in Table 2 below.

In Table 2, EA represents electron affinity, MP represents a melting point of oxide of each example of the rare earth element, and R is an ionic radius of a 6-coordinate state of each rare earth element.

Among the above-illustrated rare earth elements, scandium and yttrium are particular examples. Scandium is a more particular example. In this regard, a protective layer according to one embodiment may be made of MgO containing scandium.

The content of the at least one rare earth elements may be from about $5.0 \times 10^{-5}$ to about $6.0 \times 10^{-4}$ parts by weight, preferably from about $5.0 \times 10^{-5}$ to about $5.0 \times 10^{-4}$ parts by weight, and more preferably from about $1.5 \times 10^{-4}$ to about $4.0 \times 10^{-4}$ parts by weight, based on 1 part by weight of the MgO. In particular, a protective layer according to an embodiment may include about $4.0 \times 10^{-4}$ parts by weight of at least one rare earth element, based on 1 part by weight of MgO. If the content of the at least one rare earth element is outside the range, a reduction in discharge delay time and in temperature dependency of the discharge delay time may be unsatisfactory.

A protective layer according to the present embodiments may further include one or more elements selected from the group consisting of Al, Ca, and Si, in addition to at least one selected from the group consisting of the above-described rare earth elements.

That is, a protective layer according to the present embodiments may be made of MgO containing at least one selected from the group consisting of the rare earth elements and Al; MgO containing at least one selected from the group consisting of the rare earth elements and Ca; MgO containing at least one selected from the group consisting of the rare earth elements and Si; MgO containing at least one selected from the rare earth elements, Al, and Ca; MgO containing at least one selected from the group consisting of the rare earth elements, Ca, and Si; MgO containing at least one selected from the group consisting of the rare earth elements, Al, and Si; or MgO containing at least one selected from the group consisting of the rare earth elements, Al, Ca, and Si.

When a protective layer according to the present embodiments further includes Al, a discharge delay time at low temperature can be further reduced. In this regard, the content of Al may be from about $5.0 \times 10^{-5}$ to about $4.0 \times 10^{-4}$ parts by weight, and preferably from about $6.0 \times 10^{-5}$ to about $3.0 \times 10^{-4}$ parts by weight, based on 1 part by weight of MgO.

When a protective layer according to the present embodiments further includes Ca, the temperature dependency of a discharge delay time can be reduced. That is, a discharge

TABLE 2

| | Element | | | | | | | |
| --- | --- | --- | --- | --- | --- | --- | --- | --- |
| | Sc | Y | La | Ce | Pr | Nd | Sm | Eu |
| EA(eV) | 0.19 | 0.3 | 0.53 | 0.5 | 0 | <0 | 0.3 | <0 |
| R(pm) | 88 | 104 | 117 | 115 | 133 | 112 | 110 | 109 |
| MP(° C.) | 2485 | 2439 | 2305 | 2230 | 1230 | 2320 | 2335 | 2350 |
| | Element | | | | | | | |
| | Gd | Tb | Dy | Ho | Er | Tm | Yb | Lu |
| EA(eV) | 0.5 | 0.5 | <0 | <0 | <0 | 0.3 | <0 | 0.5 |
| R(pm) | 108 | 106 | 105 | 104 | 103 | 102 | 101 | 100 |
| MP(° C.) | 2408 | 2420 | 2410 | 2415 | 2418 | 2425 | 2435 | 2490 | delay time does not substantially change with respect to temperature. In this regard, the content of Ca may be from about $5.0 \times 10^{-5}$ to about $4.0 \times 10^{-4}$ parts by weight, and preferably from about $6.0 \times 10^{-5}$ to about $3.0 \times 10^{-4}$ parts by weight, based on 1 part by weight of MgO.

When a protective layer according to the present embodiments further includes Si, a discharge delay time at low temperature can be further reduced. In this regard, the content of Si is from about $5.0 \times 10^{-5}$ to about $4.0 \times 10^{-4}$ parts by weight, preferably from about $6.0 \times 10^{-5}$ to about $3.0 \times 10^{-4}$ parts by weight, based on 1 part by weight of MgO. In particular, if the content of Si is outside the above range, a glassy phase may be formed in a protective layer.

The above-illustrated protective layer according to the present embodiments can emit secondary electrons by gaseous ions. As the emission amount of the secondary electrons increases, a discharge initiation voltage and a discharge delay time can be improved.

Figure 3:
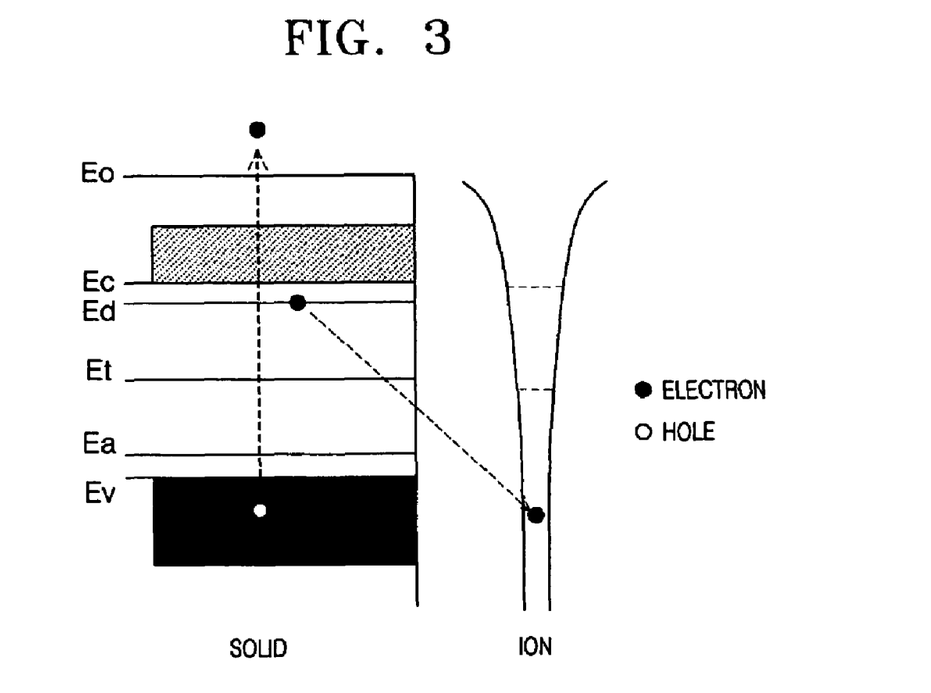
FIG. 3 is a schematic view illustrating the Auger neutralization theory describing electron emission from a solid by a gaseous ion.

While not wishing to limit the embodiments by the following explanation of this mechanism, typically, the mechanism of secondary electron emission by collision of gaseous ions with a solid can be described by the Auger neutralization theory as shown in FIG. 3. According to the Auger neutralization theory, when gaseous ions collide with a solid, electrons from the solid travel to the gaseous ions to thereby create a neutral gas. At this time, holes are formed in the solid with ejection of other electrons of the solid into vacuum. The Auger neutralization process can be represented by Equation 1 below:

$$E_k = E_I - 2(E_g + \chi), \quad (1)$$

where $E_k$ is an energy released by electrons emitted from a solid with which gaseous ions have collided, $E_I$ is a gas ionization energy, $E_g$ is a bandgap energy of the solid, and $\chi$ is the electron affinity of the solid.

The Auger neutralization theory and Equation 1 can be applied to a protective layer and a discharge gas of PDPs. When a voltage is applied to PDP pixels, seed electrons generated by cosmic rays or UV rays collide with a discharge gas to generate discharge gas ions. Collision of the discharge gas ions with a protective layer ejects secondary electrons from the protective layer, thereby leading to discharge.

Table 3 presents resonance emission wavelengths and ionization voltages (e.g., ionization energies) of inert gases that can be used as discharge gases. When a protective layer is made of MgO, the bandgap energy ($E_g$) and electron affinity ($\chi$) of MgO are about 7.7 eV and about 0.5, respectively, in Equation 1.

Meanwhile, to increase the optical conversion efficiency of phosphors in PDPs, it is preferable to use an Xe gas emitting VUV with the longest wavelength. However, considering that Xe has an ionization voltage, e.g., ionization energy ($E_I$) of 12.13 eV, a discharge voltage is considerably increased since the energy for electron emission from a protective layer made of MgO, i.e., $E_k$ of Equation 1 is less than 0. In this regard, to decrease a discharge voltage, the use of a gas with a high ionization voltage is required. According to Equation 1, $E_k$ is about 8.19 eV for He and about 5.17 eV for Ne. In this regard, it is preferable to use He or Ne to decrease a discharge initiation voltage. However, use of a He gas in PDP discharge may cause severe plasma etching of a protective layer due to the high mobility of He.

TABLE 3

| Gas | Resonance-level excitation | | | Meta stable level excitation | | Ionization voltage (V) |
|---|---|---|---|---|---|---|
| | Voltage (V) | Wavelength (nm) | Lifetime (ns) | Voltage (V) | Lifetime (ns) | |
| He | 21.2 | 58.4 | 0.555 | 19.8 | 7.9 | 24.59 |
| Ne | 16.54 | 74.4 | 20.7 | 16.62 | 20 | 21.57 |
| Ar | 11.61 | 107 | 10.2 | 11.53 | 60 | 15.76 |
| Kr | 9.98 | 124 | 4.38 | 9.82 | 85 | 14.0 |
| Xe | 8.45 | 147 | 3.79 | 8.28 | 150 | 12.13 |

In this regard, to increase a secondary electron emission level, a change in the bandgap energy $E_g$ of a protective layer can be considered instead of an increase in $E_I$ by selecting an appropriate discharge gas. A protective layer according to the present embodiments has been made from this point of view, and is made of MgO containing at least one selected from the group consisting of the rare earth elements to improve the bandgap of a material constituting the protective layer.

The physical properties of a MgO layer can be discussed mainly in terms of bulk physical properties, surface physical properties, and grain boundary physical properties. Grain boundaries of MgO are formed by out-diffusion or segregation of constitutional elements of MgO and a material (hereinafter, referred to as "doping impurity") contained in MgO. The states and electrical properties of components constituting the MgO grain boundaries vary according to the type of the doping impurity.

Meanwhile, MgO ions are 6-coordinate ions and have an octahedral geometry and a relatively small radius of about 86 pm. Thus, there are not so many types of doping impurities that can be substituted for Mg sites of MgO. In addition, MgO and a doping impurity are not well mixed due to the surface energy difference between the MgO and the doping impurity. Therefore, the doping impurity cannot help being concentrated on the MgO grain boundaries due to the ionic size of the doping impurity and a surface energy difference between MgO and the doping impurity. In this regard, a doping impurity to be concentrated on MgO grain boundaries must be selected to advantageously affect a discharge voltage, a discharge delay time, and the temperature dependency of the discharge delay time. Rare earth elements can advantageously affect the discharge characteristics of a MgO layer due to their high secondary electron emission coefficient, even when the grain boundary segregation to MgO occurs. For the same reason, Al, Ca, and Si can also improve the discharge characteristics of a MgO protective layer, in particular a discharge delay time and the temperature dependency of the discharge delay time.

A rare earth element suitable to be doped on MgO as described above can induce a bandgap shrinkage effect by creating a donor level (Ed) between the valence band (Ev) and the conduction band (Ec) of MgO. Therefore, the bandgap energy of MgO containing at least one selected from the group consisting of the rare earth elements according to the present embodiments may be smaller than the bandgap energy (effective Eg) of undoped MgO, i.e., 7.7 eV, resulting in $E_k > 0$ for a Xe discharge gas.

To create a donor level in a MgO bandgap, it is common to dope MgO with an element with an oxidation number larger than the oxidation number (+2) of Mg. On the other hand, to create an acceptor level in a MgO bandgap, it is common to dope MgO with an element with an oxidation number smaller than the oxidation number of Mg. However, for example, doping of MgO with Li(+1) creates an acceptor level but forms a P-type MgO, which renders e-beam deposition difficult. Furthermore, there are not so many types of P-type doping materials for MgO and a doping process of the P-type doping materials is also difficult. However, the above-described rare earth elements are N-type doping materials suitable for creating a donor or defect level in a MgO bandgap. The electron binding energy at the donor or defect level is less than that at the valence band, and at the same time, the energy level of the donor or defect level is greater than that at the valence band, which is advantageous for secondary electron emission by gas ion neutralization and enables exo-electron emission. Therefore, a MgO protective layer including a rare earth element can induce rapid emission of large amounts of electrons, reduce discharge delay time, and exhibit low temperature dependency of the discharge delay time. Therefore, the MgO protective layer enables single scan and an increase in Xe content. The inclusion of Al, Ca, and Si in a MgO protective layer can also provide similar effects to those in the inclusion of a rare earth element in a MgO protective layer.

A protective layer according to the present embodiments may further include one or more elements selected from the group consisting of Mn, Na, K, Cr, Fe, Zn, B, Ni, and Zr. These elements are those present in starting materials for the preparation of a composite for forming a protective layer or those that may be included in a preparation process for a composite for forming a protective layer or in a protective layer formation process using a composite for forming a protective layer.

In a protective layer according to the present embodiments, Mn may be used in an amount of about $1.0 \times 10^{-5}$ parts by weight or less; Na in an amount of about $3.0 \times 10^{-5}$ parts by weight or less; K in an amount of about $3.0 \times 10^{-5}$ parts by weight or less; Cr in an amount of about $1.0 \times 10^{-5}$ parts by weight or less; Fe in an amount of about $2.0 \times 10^{-5}$ parts by weight or less; Zn in an amount of about $3.0 \times 10^{-5}$ parts by weight or less; B in an amount of about $1.0 \times 10^{-5}$ parts by weight or less; Ni in an amount of about $1.0 \times 10^{-5}$ parts by weight or less; and Zr in an amount of about $1.5 \times 10^{-4}$ parts by weight or less, based on 1 part by weight of MgO.

Thus, a protective layer according to the present embodiments exhibits reduction in discharge delay time and in temperature dependency of the discharge delay time, and thus, is suitable for single scan and an increase in Xe content.

The present embodiments also provide a protective layer made of MgO containing chromium (Cr) and at least one rare earth element selected from the group consisting of the rare earth elements. The protective layer is the same as the above-described protective layer according to the present embodiments in terms of polycrystalline MgO, rare earth elements, Auger neutralization theory, etc., except chromium-related description, and thus, a detailed description thereof will be omitted.

In a particular embodiment, the content of the at least one rare earth element may be from about $5.0 \times 10^{-5}$ to about $6.0 \times 10^{-4}$ parts by weight, based on 1 part by weight of MgO.

In another particular embodiment, the at least one rare earth element may be scandium (Sc).

The chromium contained in the protective layer of the present embodiments serves to enhance sputtering resistance of the protective layer. The content of chromium may be from about $5.0 \times 10^{5}$ to about $6.0 \times 10^{-4}$ parts by weight, preferably from about $6.0 \times 10^{-5}$ to about $5.0 \times 10^{-4}$ parts by weight, and more preferably from about $6.0 \times 10^{-5}$ to about $4.0 \times 10^{-4}$ parts by weight, based on 1 part by weight of MgO. If the chromium content is less than about $5.0 \times 10-5$ parts by weight, an enhancement in sputtering resistance may be insufficient. On the other hand, if it exceeds about $6.0 \times 10-4$ parts by weight, the oxidation number of chromium may be easily changed, thereby lowering discharge characteristics.

The above-described protective layer according to the present embodiments including a rare earth element and a predetermined amount of chromium can exhibit a reduction in discharge delay time and in temperature dependency of the discharge delay time, and at the same time, can increase sputtering resistance, and thus, is suitable for single scan and an increase in Xe content.

The present embodiments also provide a method of forming a protective layer, which includes: uniformly mixing at least one magnesium-containing compound selected from the group consisting of magnesium oxide and magnesium salts and at least one rare earth element-containing compound selected from the group consisting of the rare earth element oxides and the rare earth element salts; calcinating the resultant mixture; sintering the calcined resultant to form a composite for forming a protective layer; and forming the protective layer using the composite for forming the protective layer.

In the protective layer formation method, the magnesium salts may be selected from the group consisting of magnesium carbonate such as $MgCO_3$ and magnesium hydroxide such as $Mg(OH)_2$. The rare earth element salts may be selected from the group consisting of chlorides, nitrates, sulfates, and carbonates of rare earth elements. For example, a scandium-containing compound may be one or more selected from the group consisting of $Sc_2O_3$, $ScCl_3$, $Sc(NO_3)_3$, and $Sc_2(SO_4)_3$, but is not limited thereto.

According to one embodiment, in the operation of mixing, at least one magnesium-containing compound selected from the group consisting of MgO, $MgCO_3$, and $Mg(OH)_2$ and at least one scandium-containing compound selected from the group consisting of $Sc_2O_3$, $ScCl_3$, $Sc(NO_3)_3$, and $Sc_2(SO_4)_3$ may be substantially uniformly mixed.

In the operation of mixing, one or more selected from the group consisting of oxides and salts of Al, Ca, and Si may be further added and mixed. The salts of Al, Ca, and Si include chlorides, nitrates, sulfates, and carbonates thereof. Examples of the oxides and salts of Al, Ca, and Si include, but are not limited to, $Al_2O_3$, CaO, $SiO_2$, $AlCl_3$, $Al(NO_3)_3$; $Al_2(SO_4)_3$, $CaCl_2$, $Ca(NO_3)_2$, $Ca(SO_4)$, and $SiCl_4$.

The present embodiments also provide a method of forming a protective layer, which includes: uniformly mixing at least one magnesium-containing compound selected from the group consisting of magnesium oxide and magnesium salts; at least one rare earth element-containing compound selected from the group consisting of the rare earth element oxides and the rare earth element salts; and at least one chromium-containing compound selected from the group consisting of chromium oxide and chromium salts; calcinating the resultant mixture; sintering the calcined resultant to form a composite for forming a protective layer; and forming the protective layer using the composite for forming the protective layer.

In the protective layer formation method, the magnesium salts may be selected from the group consisting of magnesium carbonate such as $MgCO_3$ and magnesium hydroxide such as $Mg(OH)_2$. Meanwhile, the rare earth element salts may be selected from the group consisting of chlorides, nitrates, sulfates, and carbonates of rare earth elements. For example, a scandium-containing compound may be one or more selected from the group consisting of $Sc_2O_3$, $ScCl_3$, $Sc(NO_3)_3$, and $Sc_2(SO_4)_3$, but is not limited thereto. The chromium salts may be selected from the group consisting of chromium chloride, nitrate, sulfate, and carbonate. For example, the chromium-containing compound may be $Cr_2O_3$, $Cr_2Cl_3$, $Cr_2(NO_3)_3$, $Cr_2(SO_4)_3$, $CrCl_2$ or $CrCl_3$.

According to another embodiment, in the operation of mixing, at least one magnesium-containing compound selected from the group consisting of MgO, $MgCO_3$, and $Mg(OH)_2$; at least one scandium-containing compound selected from the group consisting of $Sc_2O_3$, $ScCl_3$, $Sc(NO_3)_3$, and $Sc_2(SO_4)_3$; and at least one chromium-containing compound selected from the group consisting of $Cr_2O_3$, $Cr_2Cl_3$, $Cr_2(NO_3)_3$, $Cr_2(SO_4)_3$, and $CaCl_2$ may be substantially uniformly mixed.

In the above-described protective layer formation methods of the present embodiments, the operation of mixing may be performed using a flux. The flux is not particularly limited provided that it is a material capable of melting a magnesium-containing compound, a rare earth element-containing compound, a compound containing at least one selected from Al, Ca, and Si (if added), and a chromium-containing compound (if added). The flux may be $MgF_2$, a rare earth element fluoride, etc., but is not limited thereto. The rare earth element fluoride may be $ScF_3$, $YF_3$, and the like.

The operation of calcinating the resultant mixture is performed so that compounds contained in the resultant mixture are agglutinated. The operation of calcinating may be performed at a temperature of from about 400 to about 1,000° C., preferably from about 700 to about 900° C., for from about 1 to about 10 hours, preferably from about 2 to about 5 hours. If the operation of calcinating is performed at a temperature of less than about 400° C. for less than about 1 hour, agglutination may be insufficient. On the other hand, if the operation of calcinating is performed at a temperature greater than about 1,000° C. for more than about 10 hours, a rare earth element and/or Ca, Al, and Si(if added) and/or chromium (if added) may be lost.

The calcined resultant is sintered to form a composite for forming a protective layer which is a crystallized product of the calcined resultant. The calcined resultant may be pelletized before the sintering. The operation of sintering may be performed at a temperature of about 1,000 to about 1,750° C., preferably about 1,500° C. to about 1,700° C. for about 1 to about 10 hours, preferably about 3 to about 5 hours. If the operation of sintering is performed at a temperature of less than about 1,000° C. for less than about 1 hour, crystallization of the calcined resultant may be insufficient. On the other hand, if the operation of sintering is performed at a temperature greater than about 1,750° C. for more than about 10 hours, a rare earth element and/or Ca, Al, Si (if added), and/or chromium (if added) may be lost.

After the sintering of the calcined resultant, a composite for forming a protective layer is obtained. As used herein, the term "composite for forming a protective layer" indicates a product obtained after mixing, calcination, and sintering of the above-described starting materials (e.g., magnesium-containing compound, rare earth element-containing compound, etc.) for protective layer formation, which is made into a protective layer by various methods, for example by deposition, in a subsequent process.

A composite for forming a protective layer according to the present embodiments includes a magnesium oxide component derived from at least one magnesium-containing compound selected from the group consisting of magnesium oxide and magnesium salts; and a rare earth element component derived from at least one rare earth element-containing compound selected from the group consisting of the rare earth element oxides and the rare earth element salts.

In the composite for forming the protective layer according to the present embodiments, the magnesium salts may be selected from magnesium carbonate such as $MgCO_3$ and magnesium hydroxide such as $Mg(OH)_2$. The rare earth element salts may be selected from the group consisting of chlorides, nitrates, sulfates, and carbonates of the rare earth elements. For example, a scandium-containing compound may be one or more selected from the group consisting of $Sc_2O_3$, $ScCl_3$, $Sc(NO_3)_3$, and $Sc_2(SO_4)_3$, but is not limited thereto.

According to one embodiment, the composite for forming the protective layer may include a magnesium oxide component derived from at least one magnesium-containing compound selected from the group consisting of MgO, $MgCO_3$, and $Mg(OH)_2$; and a scandium component derived from at least one scandium-containing compound selected from the group consisting of $Sc_2O_3$, $ScCl_3$, $Sc(NO_3)_3$, and $Sc_2(SO_4)_3$.

The composite for forming the protective layer may further include a component derived from at least one selected from the group consisting of oxides and salts of Al, Ca, and Si. The salts of Al, Ca, and Si may be chlorides, nitrates, sulfates, carbonates, etc. of Al, Ca, and Si. Examples of the oxides and salts of Al, Ca, and Si include, but are not limited to, $Al_2O_3$, CaO, $SiO_2$, $AlCl_3$, $Al(NO_3)_3$, $Al_2(SO_4)_3$, $CaCl_2$, $Ca(NO_3)_2$, $(SO_4)$, and $SiCl_4$.

A composite for forming a protective layer according to the present embodiments may also include a magnesium oxide component derived from at least one magnesium-containing compound selected from the group consisting of magnesium oxide and magnesium salts; a rare earth element component derived from at least one rare earth element-containing compound selected from the group consisting of the rare earth element oxides and the rare earth element salts; and a chromium component derived from at least one chromium-containing compound selected from the group consisting of chromium oxide and chromium salts.

In one aspect, the composite further comprises one or more elements selected from the group consisting of Mn, Na, K, Cr, Fe, Zn, B, Ni, and Zr.

As used herein, the phrase "magnesium oxide component derived from at least one magnesium-containing compound selected from the group consisting of magnesium oxide and magnesium salts" indicates a product, obtained after calcination and sintering of at least one magnesium-containing compound used as a starting material, having physical and/or chemical properties different from the magnesium-containing compound. The terms "rare earth element component" and "chromium component" can also be understood in the same manner as the "magnesium oxide component" e.g., a product obtained after calcination and sintering of at least one of the compounds, etc.

In a protective layer formation method of the present embodiments, a protective layer is formed using the above-described composite for forming the protective layer. The formation of the protective layer may be performed using various non-limiting known methods such as chemical vapor deposition (CVD), e-beam deposition, ion-plating, sputtering, etc.

Figure 4:
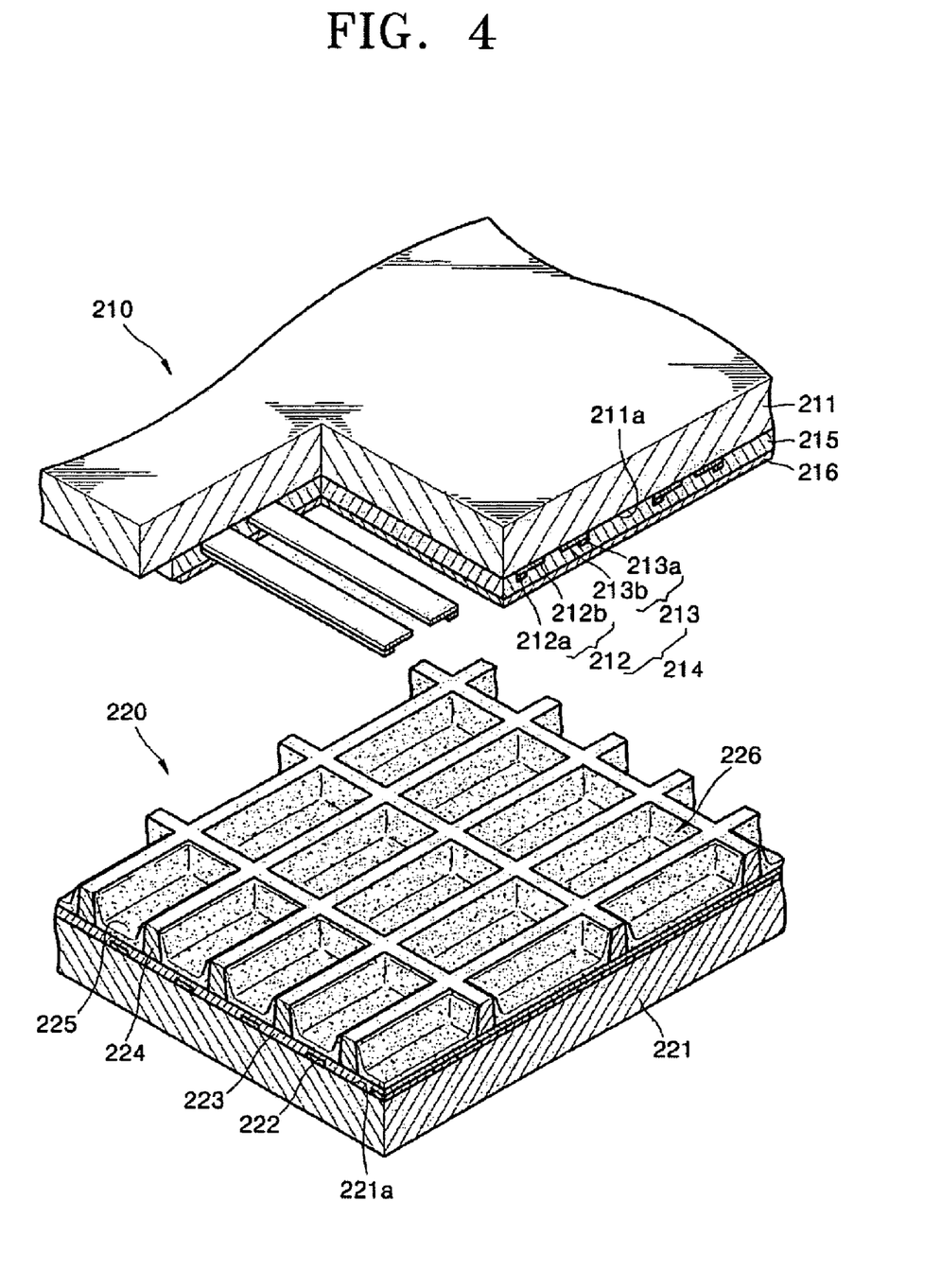
FIG. 4 illustrates a PDP including a protective layer according to the present embodiments.

A protective layer according to the present embodiments can be used in a gas discharge display device, in particular a PDP. FIG. 4 illustrates a PDP including a protective layer according to one embodiment.

Referring to FIG. 4, a front panel 210 includes a front substrate 211; sustain electrode pairs 214 formed on a rear surface 211a of the front substrate 211, each sustain electrode pair 214 including a Y electrode 212 and an X electrode 213; a front dielectric layer 215 covering the sustain electrode pairs; and a protective layer 216 covering the front dielectric layer 215 and made of MgO containing a predetermined amount of at least one selected from the group consisting of rare earth elements according to the instant embodiments. A PDP according to the present embodiments can have excellent discharge characteristics, and thus, is suitable for single scan and an increase in Xe content. A detailed description of the protective layer 216 is given above. The Y electrode 212 and the X electrode 213 include transparent electrodes 212b and 213b made of indium tin oxide (ITO), and the like and bus electrodes 212a and 213a made of a metal with good conductivity, respectively.

A rear panel 220 includes a rear substrate 221; address electrodes (222 for each) formed on a front surface 221a of the rear substrate 221 to intersect with the sustain electrode pairs; a rear dielectric layer 223 covering the address electrodes; a rib barrier 224 formed on the rear dielectric layer 223 to partition discharge cells (226 for each); and a phosphor layer 225 disposed in the discharge cells. A discharge gas in the discharge cells may be a mixed gas of Ne with one or more selected from Xe, $N_2$, and $Kr_2$, or a mixed gas of Ne with two or more of Xe, He, $N_2$, and Kr.

A protective layer according to the present embodiments can be used under a diatomic mixed gas of, for example, Ne+Xe, which contains an increased amount of Xe for increased brightness. A protective layer according to the present embodiments exhibits good sputtering resistance even in a triatomic mixed gas of Ne+Xe+He which contains a He gas for compensation for an increase in a discharge voltage, thereby preventing a reduction in the lifetime of a PDP. The present embodiments provide a protective layer capable of decreasing an increase in discharge voltage due to an increase in Xe content and satisfying a discharge delay time required for single scan.

Hereinafter, the present embodiments will be described more specifically with reference to the following examples.

EXAMPLES

Manufacturing Example 1

Manufacturing of Discharge Cell

MgO and $Sc_2O_3$ were mixed so that the content of scandium was 5.0×10−5 g per 1 g of MgO, and stirred in a mixer for 5 hours or more, to obtain a uniform mixture. $MgF_2$ used as a flux was added to the mixture, stirred, placed in a crucible, and heated at 900° C. for 5 hours. The resultant product was compression-molded into pellets and heated at 1,650° C. for 3 hours, to prepare a composite for forming a protective layer containing $5.0×10^{-5}$ g of scandium per 1 g of MgO.

Meanwhile, a glass (PD 200 Glass) of 22.5×35×3 mm in size was prepared. An Ag electrode was formed in a predetermined pattern on an upper surface of the glass. Then, the Ag electrode was covered with a PbO glass to form a PbO dielectric layer with a thickness of about 30 to 40 µm. The composite for forming the protective layer was deposited on an upper surface of the dielectric layer to form a protective layer with a thickness of 700 nm. The above processes were further repeated to thereby manufacture two substrates with the protective layer.

The two substrates were disposed so that the respective protective layers of the two substrates faced with each other, and then a spacer was disposed between the two substrates to form a cell with a cell gap of about 200 µm. The resultant structure was placed in a vacuum chamber and purged four times with a 500 Torr Ar gas so that the inner cell pressure was 2×10−6 Torr. Then, a 95% Ne+5% Xe discharge gas was injected into the cell to obtain a discharge cell with the protective layers according to the present embodiments, which was designated as "Sample 1".

Evaluation of Sc Content in Protective Layers of Sample 1

A Sc content in the protective layers of the Sample 1 was evaluated using a secondary ion mass spectrometer (SIMS). First, the Sample 1 was placed in a purge system to minimize exposure of the protective layers of Sample 1 to air. Then, a portion of the protective layers of Sample 1 was collected and placed on a sample holder for SIMS analysis. While maintaining a purge state, the sample holder was placed in a preparation chamber of the SIMS, the preparation chamber was pumped and placed in an experimental chamber, and then Sc content was measured using an oxygen ion gun. As a result, a depth profile graph of Sample 1 was obtained. The depth profile graph of Sample 1 was made in view that positive ionization characteristics of Sc are better than the negative ionization characteristics. The depth profile graph of a standard sample in which Sc content in an MgO layer was known was obtained in the same manner as in Sample 1. Detailed analysis conditions are listed in Table 4 below.

TABLE 4

| Primary ion beam | Energy | 5 keV |
| | Current | 500 nA |
| | Raster size | 500 µm × 500 µm |
| Secondary optics | | Positive mode |
| Neutralization | | Electron gun |

The depth profile graphs of the standard sample and Sample 1 according to the present embodiments were evaluated as follows to determine the Sc content of Sample 1. First, in the depth profile graph of the standard sample, an X-axis scale was converted from a time scale to a depth scale. At this time, the analyzed crater depth was measured by a surface profile measurement system and converted to a sputter rate. Then, the sputter rate was normalized using a Mg component (a matrix component) of the standard sample and then a relative sensitive factor (RSF) was calculated using a dose value determined from the standard sample.

Similarly, in the depth profile graph of Sample 1, an X-axis scale was converted from a time scale to a depth scale and then normalized using a Mg component (a matrix component) of Sample 1. Then, the depth profile graph for Sample 1 was multiplied by the RSF obtained from the standard sample. A region corresponding to the thickness of the protective layers of Sample 1 and a background were set in the depth profile graph for Sample 1, followed by integration, to obtain the Sc content of the protective layers of Sample 1.

According to the SIMS analysis result, the Sc content of the protective layers of Sample 1 was $5.0×10^{-5}$ g (50 ppm) per 1 g of MgO.

Manufacturing Example 2

A discharge cell (Sample 2) was manufactured in the same manner as in Manufacturing Example 1 except that a composite for forming a protective layer was prepared by mixing MgO and $Sc_2O_3$ so that the Sc content was $1.5×10^{-4}$ g per 1 g of MgO, and protective layers in which the Sc content was $1.5×10^{-4}$ g (150 ppm) per 1 g of MgO were formed using the composite for forming the protective layer.

Manufacturing Example 3

A discharge cell (Sample 3) was manufactured in the same manner as in Manufacturing Example 1 except that a composite for forming a protective layer was prepared by mixing MgO and $Sc_2O_3$ so that the Sc content was $3.0 \times 10^{-4}$ g per 1 g of MgO, and protective layers in which the Sc content was $3.0 \times 10^{-4}$ g (300 ppm) per 1 g of MgO were formed using the composite for forming the protective layer.

Manufacturing Example 4

A discharge cell (Sample 4) was manufactured in the same manner as in Manufacturing Example 1 except that a composite for forming a protective layer was prepared by mixing MgO and $Sc_2O_3$ so that the Sc content was $4.0 \times 10^{-4}$ g per 1 g of MgO, and protective layers in which the Sc content was $4.0 \times 10^{-4}$ g (400 ppm) per 1 g of MgO were formed using the composite for forming the protective layer.

Manufacturing Example 5

A discharge cell (Sample 5) was manufactured in the same manner as in Manufacturing Example 1 except that a composite for forming a protective layer was prepared by mixing MgO and $Sc_2O_3$ so that the Sc content was $5.0 \times 10^{-4}$ g per 1 g of MgO, layers in which the Sc content was $5.0 \times 10^{-4}$ g (500 ppm) per 1 g of MgO were formed using the composite for forming the protective layer.

Manufacturing Example 6

A discharge cell (Sample 6) was manufactured in the same manner as in Manufacturing Example 1 except that a composite for forming a protective layer was prepared by mixing MgO and $Sc_2O_3$ so that the Sc content was $6.0 \times 10^{-4}$ g per 1 g of MgO, and protective layers in which the Sc content was $6.0 \times 10^{-4}$ g (600 ppm) per 1 g of MgO were formed using the composite for forming the protective layer.

Comparative Example A

A discharge cell (Sample A) was manufactured in the same manner as in Manufacturing Example 1 except that a composite for forming a protective layer was prepared by mixing MgO and $Sc_2O_3$ so that the Sc content was $1.0 \times 10^{-5}$ g per 1 g of MgO, and protective layers in which the Sc content was $1.0 \times 10^{-5}$ g (10 ppm) per 1 g of MgO were formed using the composite for forming the protective layer.

Comparative Example B

A discharge cell (Sample B) was manufactured in the same manner as in Manufacturing Example 1 except that a composite for forming a protective layer was prepared by mixing MgO and $Sc_2O_3$ so that the Sc content was $1.0 \times 10^{-3}$ g per 1 g of MgO, and protective layers in which the Sc content was $1.0 \times 10^{-3}$ g (1,000 ppm) per 1 g of MgO were formed using the composite for forming the protective layer.

Evaluation Example 1

Discharge Delay Time for Samples A, 1, 2, 3, 4, 5, 6, and B

Figure 5:
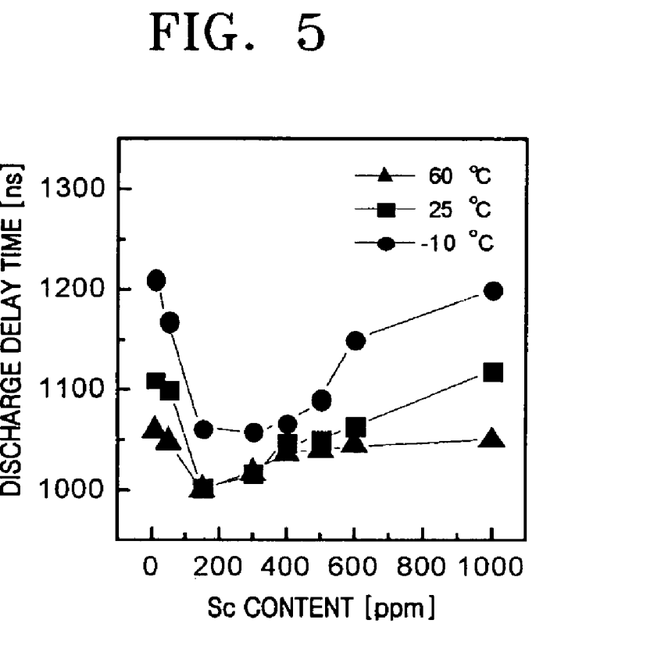
FIG. 5 is a graph illustrating a discharge delay time with temperature of a discharge cell including a protective layer according to the present embodiments.

A discharge delay time (unit: ns) for the Samples A, 1, 2, 3, 4, 5, 6, and B was evaluated at various temperatures and the results are shown in FIG. 5.

To evaluate the discharge delay time, a Tektronix (Richardson, Tex., USA) oscilloscope, a Trek amplifier, an NF function generator, a high vacuum chamber, a Peltier device, an I-V power source, and an LCR Meter were used. First, Sample A was connected to the LCR meter and then a discharge initiation voltage and a discharge delay time were measured at −10° C., 25° C., and 60° C. The discharge initiation voltage was measured using a 2 kHz sinuous wave and the discharge delay time was measured using a 2 kHz square wave. The same procedure was also applied to the Samples 1, 2, 3, 4, 5, 6, and B.

In FIG. 5, graphs represented by -▲-, -■-, and -●- indicate discharge delay times at 60° C., 25° C., and −10° C., respectively.

Referring to FIG. 5, Samples A and B in which the Sc content was 10 ppm and 1,000 ppm, respectively, had a maximum discharge delay time of about 1,200 ns and a minimum discharge delay time of about 1,050 ns, depending on the temperature. That is, discharge delay time values and the temperature dependency of discharge delay time were very high.

However, Samples 1, 2, 3, 4, 5, and 6 according to the present embodiments had low discharge delay time values and improved temperature dependency of discharge delay time, relative to Samples A and B. In particular, the Sample 4, in which the Sc content was 400 ppm, exhibited substantially no change in discharge delay time with temperature. Further, Sample 2, in which the Sc content was 150 ppm, exhibited the lowest discharge delay time, i.e., about 1,000 ns.

Therefore, it can be seen that Samples 1 through 6 according to the present embodiments are suitable for single scan and an increase in Xe content due to generally very low discharge delay time values and low temperature dependency of discharge delay time.

Evaluation Example 2

Figure 6:
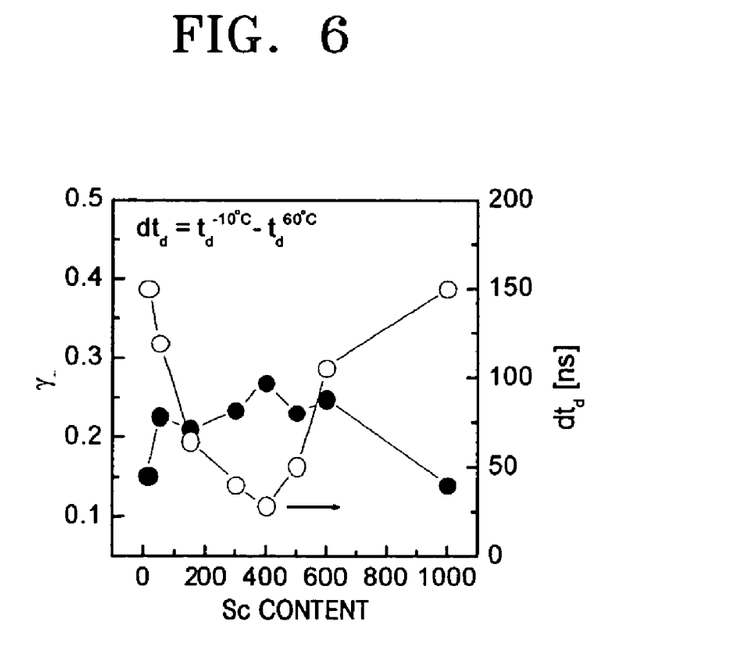
FIG. 6 is a graph illustrating a secondary electron emission coefficient and a variation in discharge delay time of a discharge cell including a protective layer according to the present embodiments.

Secondary Electron Emission Coefficient and Variation in Discharge Delay Time for Samples A, 1, 2, 3, 4, 5, 6, and B The secondary electron emission coefficients γ for Samples A, 1, 2, 3, 4, 5, 6, and B were evaluated and the results are shown in FIG. 6. A variation in discharge delay time is also shown in FIG. 6. In FIG. 6, the graph represented by -●- indicates the secondary electron emission coefficient and the graph represented by -○- indicates the variation in discharge delay time.

The secondary electron emission coefficient was measured using an rf-plasma apparatus. In more detail, the protective layers of the Sample A were exposed to rf-plasma and then a negative voltage (−100V) was applied to the protective layers. Current generated by surface charging of the protective layers and secondary electron emission was measured and processed into a mathematical value to obtain the secondary electron emission coefficient. The same procedure was also applied to Samples 1, 2, 3, 4, 5, 6, and B.

Meanwhile, a variation in discharge delay time (dt) was obtained by subtracting the discharge delay time at 60° C. from the discharge delay time at −10° C.

Referring to FIG. 6, Samples A and B exhibited a relatively low secondary electron emission coefficient of about 0.15, whereas Samples 1, 2, 3, 4, 5, and 6 exhibited a high secondary electron emission coefficient of about 0.2. In particular, Sample 4, in which the Sc content was 400 ppm, had a very high secondary electron emission coefficient of 0.25. However, Sample 2, in which the Sc content was 200 ppm, exhibited a relatively low secondary electron emission coefficient. This might be because there was a difference in grain sizes of protective layer formation composite pellets which were used as deposition sources of Sample 2.

Meanwhile, Samples A and B exhibited a relatively large variation in discharge delay time with temperature of about 150 ns. On the other hand, Samples 1, 2, 3, 4, 5, and 6 according to the present embodiments exhibited a small variation in discharge delay time with temperature of about up to 120 ns. In particular, Sample 4, in which the Sc content was 400 ppm, had a very low variation in discharge delay time of about 25 ns.

Therefore, it can be seen that Samples 1, 2, 3, 4, 5, and 6 according to the present embodiments are suitable for single scan and an increase in Xe content due to a high secondary electron emission coefficient and a very low variation in discharge delay time with temperature.

Example 1

Manufacturing of Panel with Protective Layer According to the Present Embodiments Panel Manufacturing MgO and $Sc_2O_3$ were mixed so that the Sc content was $4.0 \times 10^{-4}$ g per 1 g of MgO, and stirred in a mixer for 5 hours or more, to prepare a uniform mixture. $MgF_2$ used as a flux was added to the mixture, stirred, placed in a crucible, and heated at 900° C. for 5 hours. The resultant product was compression-molded into pellets and heated at 1,650° C. for 3 hours to obtain a composite for forming a protective layer in which the Sc content was $4.0 \times 10^{-4}$ g per 1 g of MgO.

Meanwhile, address electrodes made of copper were formed on a glass substrate with a thickness of 2 mm using a photolithography process. The address electrodes were coated with a PbO glass to form a rear dielectric layer with a thickness of 20 cm. Then, red, green, and blue phosphors were coated on the rear dielectric layer to prepare a rear substrate.

Bus electrodes made of copper were formed on a glass substrate with a thickness of 2 mm by a photolithography process. The bus electrodes were coated with a PbO glass to form a front dielectric layer with a thickness of 20 μm. Then, the composite for forming the protective layer used as a deposition source was deposited on the front dielectric layer by e-beam evaporation, to form a protective layer in which the Sc content was $4.0 \times 10^{-4}$ g (400 ppm) per 1 g of MgO. During the e-beam evaporation, a substrate temperature was 250° C., and a deposition pressure was set to $6 \times 10^{-4}$ torr by injection of oxygen and argon gases through a gas flow controller. As a result, a front substrate was prepared.

The front substrate and the rear substrate were spaced 130 μm apart from each other to define cells. The cells were filled with a mixed gas of Ne(95%)+Xe(5%) as a discharge gas to thereby manufacture a 42-inch SD-grade V3 PDP, which was designated "Panel 1".

Analysis of Sc Content in Protective Layer of Panel 1

The Sc content in the protective layer of Panel 1 was evaluated using SIMS. First, Panel 1 was placed in a purge system to minimize exposure of the protective layer of Panel 1 to air. Then, a portion of the protective layer of Panel 1 was collected and placed on a sample holder for SIMS analysis. While maintaining a purge state, the sample holder was placed in a preparation chamber of the SIMS, the preparation chamber was pumped and placed in an experimental chamber, and then the Sc content was measured using an oxygen ion gun. As a result, a depth profile graph of Panel 1 was obtained. The depth profile graph of Panel 1 was made in view that positive ionization characteristics of Sc are better than the negative ionization characteristics. The depth profile graph of a standard sample in which Sc content in an MgO layer was known was obtained in the same manner as in Panel 1. Detailed analysis conditions are listed in the above Table 4.

The depth profile graphs of the standard sample and Panel 1 according to the present embodiments were evaluated as follows to determine the Sc content of the protective layer of Panel 1. First, in the depth profile graph of the standard sample, an X-axis scale was converted from a time scale to a depth scale. At this time, the analyzed crater depth was measured by a surface profile measurement system and converted to a sputter rate. Then, the sputter rate was normalized using a Mg component (a matrix component) of the standard sample and then a RSF was calculated using a dose value determined from the standard sample.

Similarly, in the depth profile graph for the protective layer of Panel 1, an X-axis scale was converted from a time scale to a depth scale and then normalized using a Mg component (a matrix component) of the protective layer of Panel 1. Then, the depth profile graph for the protective layer of Panel 1 was multiplied by the RSF obtained from the standard sample. A region corresponding to the thickness of the protective layer of Panel 1 and a background were set in the depth profile graph for the protective layer of Panel 1, followed by integration, to obtain the Sc content of the protective layer of Panel 1.

According to the SIMS analysis result, the Sc content of the protective layer of Panel 1 was $4.0 \times 10^{-4}$ g (400 wtppm) per 1 g of MgO.

Comparative Example C

The panel (Panel C) was manufactured in the same manner as in Example 1 except that monocrystalline MgO was used as a deposition source instead of the composite for forming the protective layer.

Evaluation Example 4

Discharge Delay Time for Panels 1 and C

Figure 7:
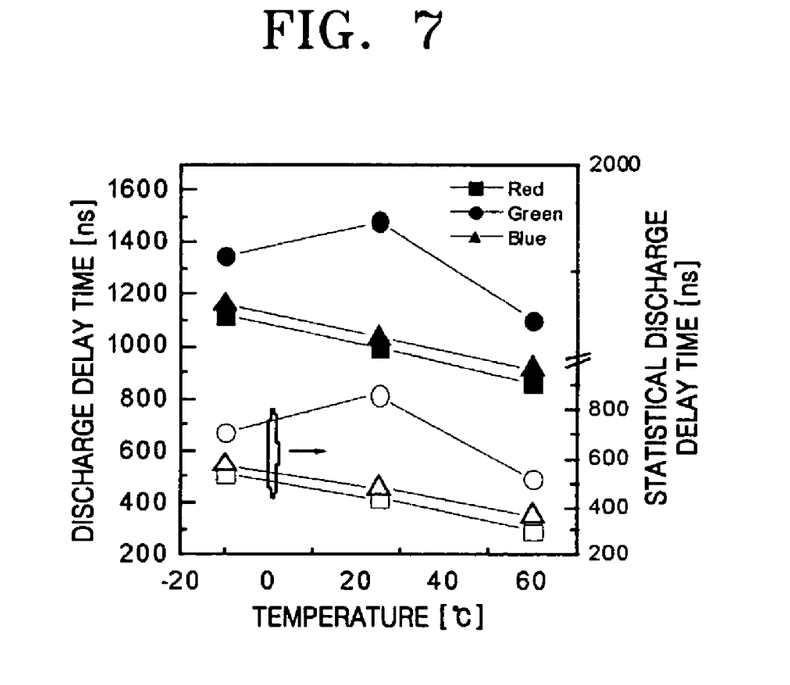
FIG. 7 is a graph illustrating a discharge delay time with temperature of a 42-inch SD-grade panel including a protective layer made of monocrystalline magnesium oxide.
Figure 8:
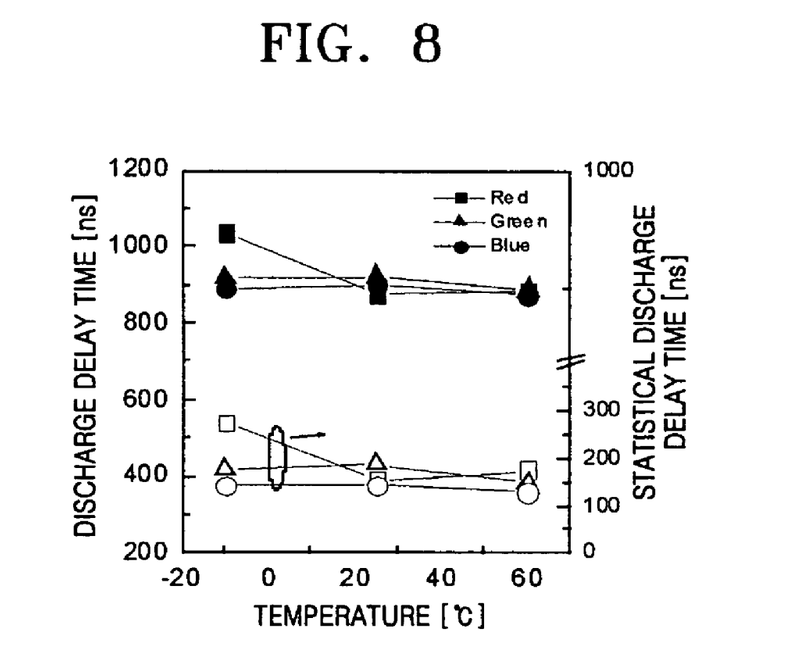
FIG. 8 is a graph illustrating a discharge delay time with temperature of a 42-inch standard definition (SD)-grade panel including a protective layer according to the present embodiments.

The discharge delay times for Panels C and 1 were evaluated and the results are shown in FIGS. 7 and 8. For this, an optical sensor, an oscilloscope and a peltier device were used.

In FIGS. 7 and 8, the graphs represented by -■-, -●-, and -▲- indicate the discharge delay time for red, green, and blue pixels, respectively, and the graphs represented by -□-, -○-, and -Δ- indicate the statistical discharge delay time for the red, green, and blue pixels, respectively.

Referring to FIG. 7, both the discharge delay time and statistical discharge delay time of the panel changed substantially with temperature, which indicates high temperature dependency of discharge delay time and statistical discharge delay time of Panel C. In more detail, Panel C exhibited a minimum discharge delay time of about 850 ns and a maximum discharge delay time of about 1,500 ns at −10° C., 25° C., and 60° C.

On the other hand, referring to FIG. 8, the discharge delay time and statistical discharge delay time of Panel 1 did not substantially change with temperature. In more detail, Panel 1 exhibited a minimum discharge delay time of about 900 ns and a maximum discharge delay time of about 1,050 ns at −10° C., 25° C., and 60° C. In particular, the red and blue pixels maintained the discharge delay time of about 900 ns at −10° C., 25° C., and 60° C. Therefore, it can be seen that Panel 1 with the protective layer according to the present embodiments is suitable for single scan and an increase in Xe content due to a low discharge delay time and low temperature dependency of the discharge delay time.

Manufacturing Example 7

MgO, $Sc_2O_3$, and $Cr_2O_3$ were mixed so that the Sc content was $3.0\times10^{-4}$ g and the Cr content was $1.0\times10^{-4}$ g per 1 g of MgO, and stirred in a mixer for 5 hours or more, to prepare a uniform mixture. $MgF_2$ used as a flux was added to the mixture, stirred, placed in a crucible, and heated at 900° C. for 5 hours. The resultant product was compression-molded into pellets and heated at 1,650° C. for 3 hours, to prepare a composite for forming a protective layer in which the Sc content was $3.0\times10^{-4}$ g and the Cr content was $1.0\times10^{-4}$ g per 1 g of MgO.

Meanwhile, a glass (PD 200 Glass) of 22.5×35×3 mm in size was prepared. Then, an Ag electrode was formed in a predetermined pattern on an upper surface of the glass and then coated with a PbO glass, to form a PbO dielectric layer with a thickness of about 30 to 40 µm. The composite for forming the protective layer was deposited on an upper surface of the dielectric layer to form a protective layer with a thickness of 700 nm. The same procedure was further performed to obtain two substrates with the protective layer.

The two substrates were disposed so that the respective protective layers of the two substrates faced with each other and then a spacer was disposed between the two substrates, to form a cell with a cell gap of about 200 µm. The resultant structure was placed in a vacuum chamber and purged four times with a Ar gas at 500 Torr so that an inner cell pressure was $2\times10^{-6}$ Torr. Then, a discharge gas of 95% Ne+5% Xe was injected into the cell, to obtain a discharge cell with the protective layers according to the present embodiments, which was designated as "Sample 7".

The Sc content and Cr content of the protective layers of Sample 7 were evaluated in the same manner as the Sc content evaluation method in Manufacturing Example 1. As a result, the Sc content was $3.0\times10^{-4}$ g (300 ppm) and the Cr content was 1.0×10–4 g (100 ppm), based on 1 g of MgO.

Manufacturing Example 8

A discharge cell (Sample 8) was manufactured in the same manner as in Manufacturing Example 7 except that a composite for forming a protective layer was prepared by mixing MgO, $Sc_2O_3$, and $Cr_2O_3$ so that the Sc content was $3.0\times10^{-4}$ g and the Cr content was $2.0\times10^{-4}$ g per 1 g of MgO, and protective layers in which the Sc content was 3.0×10–4 g and the Cr content was $2.0\times10^{-4}$ g per 1 g of MgO were formed using the composite for forming the protective layer.

Manufacturing Example 9

A discharge cell (Sample 9) was manufactured in the same manner as in Manufacturing Example 7 except that a composite for forming a protective layer was prepared by mixing MgO, $Sc_2O_3$, and $Cr_2O_3$ so that the Sc content was $3.0\times10^{-4}$ g and the Cr content was $3.0\times10^{-4}$ g per 1 g of MgO, and protective layers in which the Sc content was $3.0\times10^{-4}$ g and the Cr content was $3.0\times10^{-4}$ g per 1 g of MgO were formed using the composite for forming the protective layer.

Comparative Example D

A discharge cell (Sample D) was manufactured in the same manner as in Manufacturing Example 7 except that protective layers were formed using polycrystalline MgO instead of the composite for forming the protective layer.

Evaluation Example 5

Sputtering Resistance of Samples D, 7, 8, and 9

Figure 9:
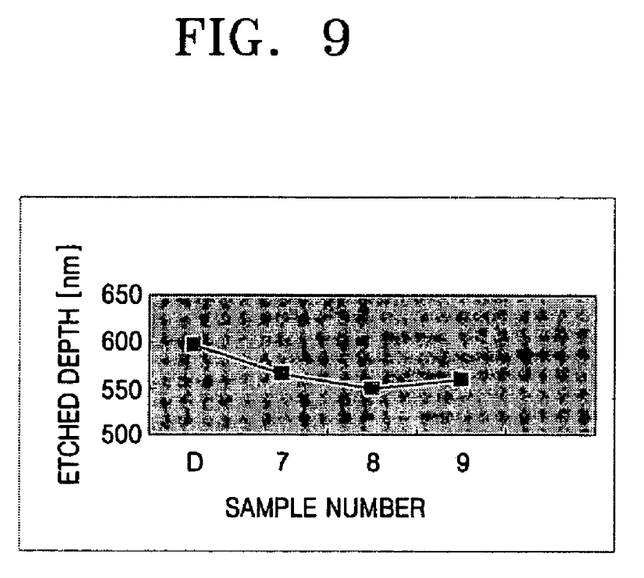
FIG. 9 is a graph illustrating sputtering resistance of a protective layer according to the present embodiments and a conventional protective layer.
Figure 10:
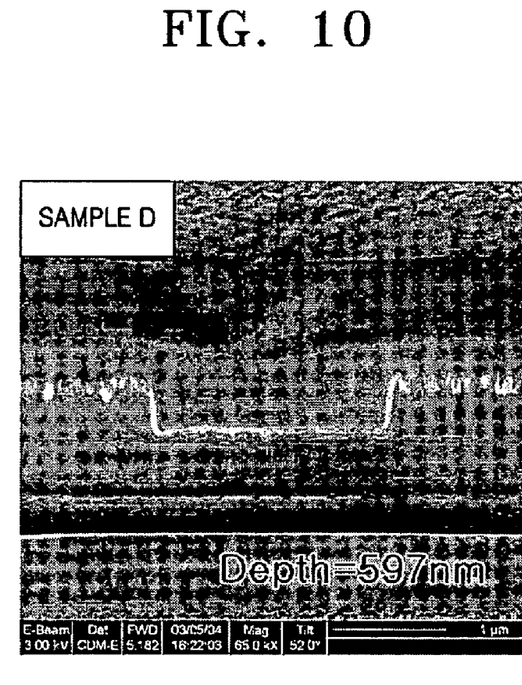
FIG. 10 is an electron microscopic image of an etched section of a conventional protective layer.

The sputtering resistance of the Samples D, 7, 8, and 9 was evaluated using a Focused Ion Beam (FIB) machine and the results are shown in FIG. 9. An electron microscopic image of an etched section of Sample D after the FIB experiment is shown in FIG. 10. The FIB experiment was performed by measuring an etched depth after scanning an Ar ion (50 pA, 30 keV) on a surface of a protective layer for 95 seconds. The etched depth was measured using an electron microscope attached to the FIB machine. The etched depth was greater when the sputtering resistance of a protective layer was lower.

Referring to FIG. 9, the etched depth of the Sample D was about 600 nm, whereas the etched depth of the Samples 7, 8, and 9 was about 550 nm.

Therefore, it can be seen that the Samples 7, 8, and 9 exhibited good sputtering resistance due to the presence of chromium.

The present embodiments provide a protective layer made of MgO containing a rare earth element. A panel including the protective layer exhibits excellent discharge characteristics such as a reduction in discharge delay time and remarkably reduced temperature dependency of the discharge delay time. The present embodiments also provide a protective layer made of MgO containing a rare earth element and chromium. A panel including the protective layer exhibits excellent discharge characteristics such as high sputtering resistance, reduction in discharge delay time, and remarkably reduced temperature dependency of the discharge delay time. Therefore, a protective layer according to the present embodiments is very suitable for single scan and an increase in Xe content. The use of the protective layer enables the fabrication of a PDP with high brightness and a long lifetime.

What is claimed is:

1. A protective layer comprising magnesium oxide and at least one rare earth element, in which the content of at least one rare earth element is from about $5.0\times10^{-5}$ to about $6.0\times10^{-4}$ parts by weight per 1 part by weight of the magnesium oxide.

2. The protective layer of claim 1, wherein the at least one rare earth element is scandium (Sc).

3. The protective layer of claim 1, wherein the content of at least one rare earth element is from about $5.0\times10^{-4}$ to about $5.0\times10^{-4}$ parts by weight per 1 part by weight of the magnesium oxide.

4. The protective layer of claim 1, wherein the content of at least one rare earth element is from about $1.5\times10^{-4}$ to about $4.0\times10^{-4}$ parts by weight per 1 part by weight of the magnesium oxide.

5. The protective layer of claim 1, further comprising one or more elements selected from the group consisting of Al, Ca, and Si.

6. The protective layer of claim 5, wherein when the protective layer comprises Al, the content of Al is from about $5.0\times10^{-5}$ to about $4.0\times10^{-4}$ parts by weight per 1 part by weight of the magnesium oxide.

7. The protective layer of claim 5, wherein when the protective layer comprises Ca and the content of Ca is from about $5.0\times10^{-5}$ to about $4.0\times10^{-4}$ parts by weight per 1 part by weight of the magnesium oxide.

8. The protective layer of claim 5, wherein when the protective layer comprises Si and the content of Si is from about $5.0\times10^5$ to about $4.0\times10^{-4}$ parts by weight per 1 part by weight of the magnesium oxide.

9. The protective layer of claim 1, further comprising one or more elements selected from the group consisting of Mn, Na, K, Cr, Fe, Zn, B, Ni, and Zr.

10. The protective layer of claim 5, further comprising one or more elements selected from the group consisting of Mn, Na, K, Cr, Fe, Zn, B, Ni, and Zr.

11. The protective layer of claim 9, wherein the protective layer comprises at least one selected from the group consisting of about $1.0\times10^{-5}$ parts by weight or less of Mn; about $3.0\times10^{-5}$ parts by weight or less of Na; about $3.0\times10^{-5}$ parts by weight or less of K; about $1.0\times10^{-5}$ parts by weight or less of Cr; about $2.0\times10^{-5}$ parts by weight or less of Fe; about $3.0\times10^{-5}$ parts by weight or less of Zn; about $1.0\times10^{-5}$ parts by weight or less of B; about $1.0\times10^{-5}$ parts by weight or less of Ni; and about $1.5\times10^{-4}$ pans by weight or less of Zr, based on 1 part by weight of the magnesium oxide.

12. The protective layer of claim 10, wherein the protective layer comprises at least one selected from the group consisting of about $1.0\times10^{-5}$ parts by weight or less of Mn; about $3.0\times10^{-5}$ parts by weight or less of Na; about $3.0\times10^{-5}$ parts by weight or less of K; about $1.0\times10^{-5}$ parts by weight or less of Cr; about $2.0\times10^{-5}$ parts by weight or less of Fe; about $3.0\times10^{-5}$ parts by weight or less of Zn; about $1.0\times10^{-5}$ parts by weight or less of B; about $1.0\times10^{-5}$ parts by weight or less of Ni; and about $1.5\times10^{-4}$ parts by weight or less of Zr, based on 1 part by weight of the magnesium oxide.

13. A protective layer made of magnesium oxide containing chromium and at least one rare earth element selected from the group consisting of the rare earth elements.

14. The protective layer of claim 13, wherein the content of at least one rare earth element is from about $5.0\times10^{-5}$ to about $6.0\times10^{-4}$ parts by weight per 1 part by weight of the magnesium oxide.

15. The protective layer of claim 13, wherein the rare earth element is scandium (Sc).

16. The protective layer of claim 13, wherein the content of chromium is from about $5.0\times10^{-5}$ to about $6.0\times10^{-4}$ parts by weight per 1 part by weight of the magnesium oxide.

17. A composite for forming a protective layer, the composite comprising:
a magnesium oxide component derived from at least one magnesium-containing compound selected from the group consisting of magnesium oxide and magnesium salts; and
a rare earth element component derived from at least one rare earth element-containing compound selected from the group consisting of the rare earth element oxides and the rare earth element salts
wherein the content of at least one rare earth element component is from about $5.0\times10^{-5}$ to about $6.0\times10^{-4}$ parts by weight per 1 part by weight of the magnesium oxide component.

18. The composite of claim 17, wherein the content of at least one rare earth element component is from about $5.0\times10^{-5}$ to about $5.0\times10^{-4}$ parts by weight per 1 part by weight of the magnesium oxide component.

19. The composite of claim 17, wherein the content of at least one rare earth element component is from about $1.5\times10^{-4}$ to about $4.0\times10^{-4}$ parts by weight per 1 part by weight of the magnesium oxide component.

20. The composite of claim 17, wherein the magnesium salts are selected from the group consisting of magnesium carbonate and magnesium hydroxide, and the rare earth element salts are selected from the group consisting of chlorides, nitrates, sulfates, and carbonates of rare earth elements.

21. The composite of claim 17, wherein the rare earth element component is a Sc component.

22. The composite of claim 21, wherein the Sc component is a Sc oxide.

23. The composite of claim 21, wherein the Sc component is a Sc salt.

24. The composite of claim 17, further comprising a component derived from one or more selected from the group consisting of oxides and salts of Al, Ca, and Si.

25. The composite of claim 24, wherein when the composite comprises an Al component and the content of the Al component is from about $5.0\times10^{-5}$ to about $4.0\times10^{-4}$ parts by weight per 1 part by weight of the magnesium oxide component.

26. The composite of claim 24, wherein when the composite comprises a Ca component and the content of the Ca component is from about $5.0\times10^{-5}$ to about $4.0\times10^{-4}$ parts by weight per 1 part by weight of the magnesium oxide component.

27. The composite of claim 25, wherein when the composite comprises a Si component and the content of the Si component is from about $5.0\times10^{-5}$ to about $4.0\times10^{-4}$ parts by weight per 1 part by weight of the magnesium oxide component.

28. The composite of claim 17, further comprising one or more elements selected from the group consisting of Mn, Na, K, Cr, Fe, Zn, B, Ni, and Zr.

29. The composite of claim 28, wherein the composite comprises at least one selected from the group consisting of about $1.0\times10^{-5}$ parts by weight or less of Mn; about $3.0\times10^{-5}$ parts by weight or less of Na; about $3.0\times10^{-5}$ parts by weight or less of K; about $1.0\times10^{-5}$ parts by weight or less of Cr; about $2.0\times10^{-5}$ parts by weight or less of Fe; about $3.0\times10^{-5}$ parts by weight or less of Zn; about $1.0\times10^{-5}$ pans by weight or less of B; about $1.0\times10^{-5}$ parts by weight or less of Ni; and about $1.5\times10^{-4}$ parts by weight or less of Zr based on 1 part by weight of the magnesium oxide component.

30. A composite for forming a protective layer, the composite comprising:
a magnesium oxide component derived from at least one magnesium-containing compound selected from the group consisting of magnesium oxide and magnesium salts;
a rare earth element component derived from at least one rare earth element-containing compound selected from the group consisting of the rare earth element oxides and the rare earth element salts; and
a chromium component derived from at least one chromium-containing compound selected from the group consisting of chromium oxide and chromium salts.

31. The composite of claim 30, further comprising one or more elements selected from the group consisting of Mn, Na, K, Cr, Fe, Zn, 5, Ni, and Zr.

32. The composite of claim 31, wherein the composite comprises at least one selected from the group consisting of about $1.0\times10^{-5}$ parts by weight or less of Mn; about $3.0\times10^{-5}$ parts by weight or less of Na; about $3.0\times10^{-5}$ parts by weight or less of K; about $1.0\times10^5$ parts by weight or less of Cr; about $2.0\times10^{-5}$ parts by weight or less of Fe; about $3.0\times10^{-5}$ parts by weight or less of Zn; about $1.0\times10^{-5}$ parts by weight or less of B; about $1.0\times10^{-5}$ parts by weight or less of Ni; and about $1.5\times10^{-4}$ parts by weight or less of Zr, based on 1 part by weight of the magnesium oxide component.

33. The composite of claim 31, wherein the content of the Cr component is from about $5.0\times10^{-5}$ to about $6.0\times10^{-4}$ parts by weight per 1 part by weight of the magnesium oxide component.

\* \* \* \* \*